Dec. 31, 1929.  H. H. WAIT  1,741,262
ARMATURE CONSTRUCTION
Filed March 30, 1927   2 Sheets-Sheet 1

Witness:
Harry H. Hitzeman

Inventor:
Henry H. Wait
By Ira J. Wilson
Atty.

Dec. 31, 1929.  H. H. WAIT  1,741,262
ARMATURE CONSTRUCTION
Filed March 30, 1927   2 Sheets-Sheet 2
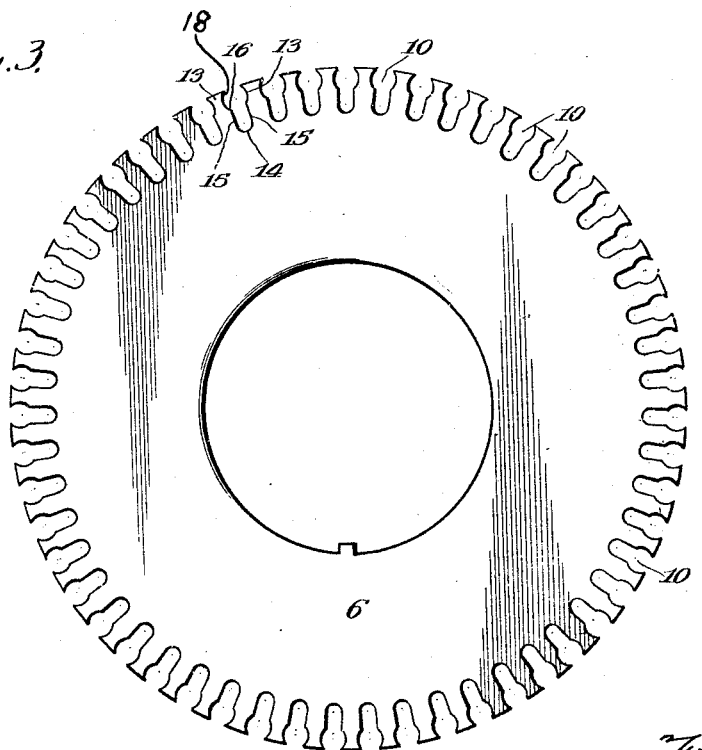
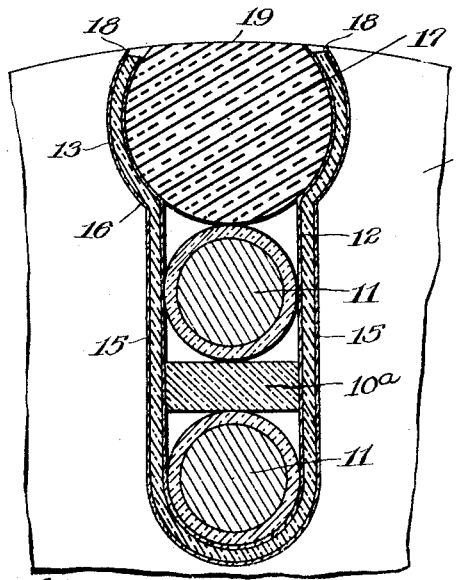
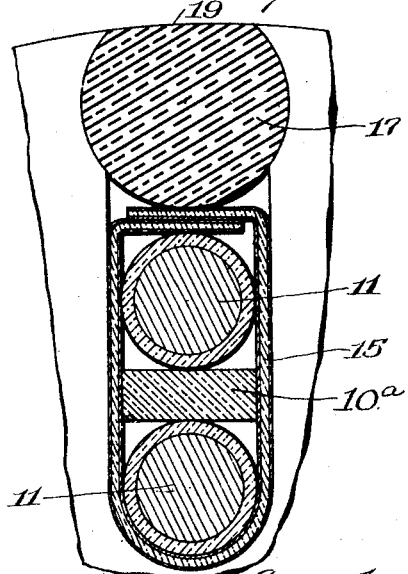
Inventor:
Henry H. Wait
By Ira J. Wilson
atty.

Patented Dec. 31, 1929

1,741,262

UNITED STATES PATENT OFFICE

HENRY H. WAIT, OF CHESTERTON, INDIANA

ARMATURE CONSTRUCTION

Application filed March 30, 1927. Serial No. 179,406.

This invention relates to armature constructions in general and more particularly to those employing laminated cores made up of a plurality of metal disks.

In the manufacture of armatures of the above type having numerous metallic disks which are secured together to form the armature core the individual disks are usually provided with a plurality of angularly spaced radial slots extending inwardly from the periphery to hold the electrical conductors. Each of the slots contains a wedge at its outer end to retain the conductors in the slot. The particular shape of this slot is important because of the machine work involved in the manufacture of the many disks going to make up an armature core and because of the high speed at which armatures are driven and the necessity for preventing mechanical injury to the conductors or the breaking down of the insulation.

It is accordingly the primary object of this invention to provide an armature construction employing an armature disk which is so constructed that it may be economically manufactured and assembled and in addition is durable and heat resistive.

Other aims and objects of this invention will be apparent from the specification and claims when examined in connection with the accompanying drawings wherein;

Fig. 3 is an enlarged detail view of an armature disk.

Fig. 4 is an enlarged fragmentary view showing the position of the wedge and conductors in one of the slots of the disk.

Fig. 5 is a similar view of a modification.

Figure 1:
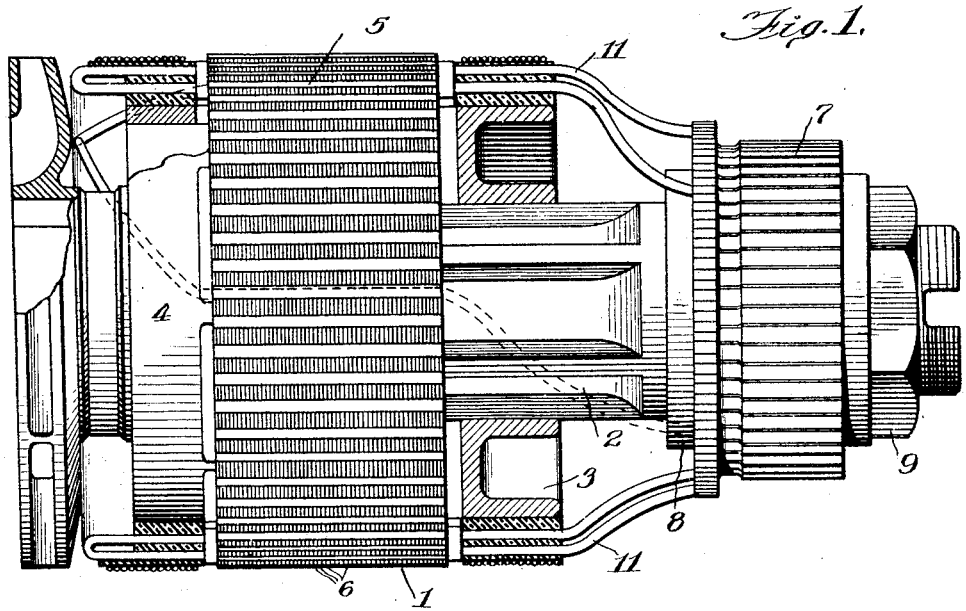
Fig. 1 is a longitudinal view partly in section of an armature embodying this invention.
Figure 2:
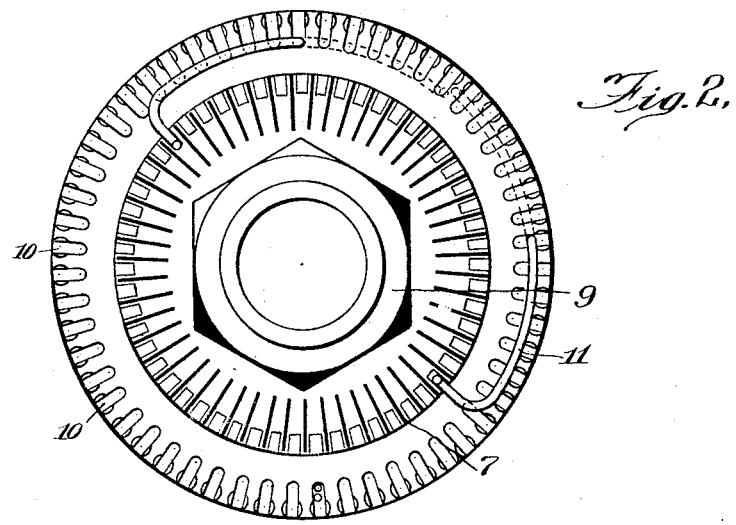
Fig. 2 is an end view of the same.

Referring to the drawings more particularly numeral 1 indicates generally an armature including an armature sleeve 2 adapted to be mounted on a drive shaft (not shown) and suitably keyed thereto. A pair of supporting disks 3 and 4 respectively, are rigidly secured on the sleeve 2 and act to hold between them an armature core 5 made up of a plurality of armature disks 6. Each of the disks 6 is provided with a plurality of equiangularly spaced radial slots 10 extending inwardly from its periphery, the slots of each disk being in axial alignment with the corresponding slots in the other disks.

A commutator 7 is held on the sleeve 1 against a shoulder 8 thereon by a nut 9 threaded on the end of said sleeve.

A plurality of conductors 11 are wound on the armature in a suitable manner. For illustrative purposes the winding of the armature is shown as a two circuit wave winding each conductor 11 being passed twice through its corresponding slots in the armature with its opposite ends secured to different bars of the commutator. The conductors are held in their slots by axial wedges 17 which are of cylindrical form for reasons which will be apparent.

The two lengths of each of the conductors are laid one above the other in the armature slots as illustrated more particularly in Fig. 4 and enfolded by a sheet of insulation 12 which consists preferably of an inner layer of mica and two outer layers of what is known as fish paper.

In view of the large amount of machine work ordinarily involved in the provision of the radial slots in the armature disks particularly where the disks are made of hard steel for high speed machines the slots are preferably formed by punching two round holes for each slot and joining the two holes by a slot. One reason for making the holes round is that punches and dies can be very cheaply renewed by turning and drilling. The first or outer hole thus punched forms the circular edges 13 at the outer end of the slot and the inner holes froms the circular edge 14 at the inner end. The outer hole which forms the edges 13 is considerably larger than the inner hole which forms the edge 14 and intersects the perimeter of the disc forming shoulders 18 which act to retain the wedge as will be hereinafter explained. The two holes are then connected by a slot which forms substantially parallel side edges 15 tangent to the edge 14. The outer ends of the edges 15 intersect the circle of which the edges 13 are a part forming with the latter edges abrupt shoulders 16. The two lengths of the conductor 11 are contained between the parallel edges 15 of the slot and the cylindrical wedge 17 is driven in the outer end of the slot to hold said lengths of the conductor in place, the shoulders 18 acting to prevent said wedge from being dislodged by centrifugal force and the shoulders 16 acting to prevent the wedge from injuring the conductors. After each of the slots is provided with its respective conductor and wedge the wedges are cut down as at 19 to cause the exposed portions of the wedges to coincide with the periphery of the core.

Another reason for making at least the outer hole of each slot round is so that a round cylindrical wedge such as the wedge 17 may be used which is very convenient and inexpensive to manufacture and which is stronger than the ordinary flat wedge.

As indicated in Fig. 4 the sheet of insulation 12 may be laid in the slot so that the wedge will bind the edges of said sheet or as indicated in Fig. 5 the edges of said sheet may be folded over above the conductor beneath the wedge. The two lengths of the conductor in the slot are separated by a strip of insulating material 10ª. The wedge 17 is of a nonflammable substance preferably bakelite composition and it is found in actual practice that the armature constructed as described is heat resistant to a very high degree.

While the invention has been illustrated and described in connection with an armature for a dynamo-electric machine, it is not so limited, as will be appreciated. As a matter of fact the invention may be applied to a magnetizable core, armature or field, stator or rotor. The word "cylinder", as used herein, is defined as that surface generated by revolution of one side of a rectangle with the parallel side of the rectangle as an axis.

I am aware that many changes may be made without departing from the principles of this invention and I do not wish to be limited to the details shown or described.

I claim:

1. In a dynamo-electric machine, a laminated core comprising a plurality of disks, each having angularly spaced radial slots extending inwardly from its periphery, the edge of said disk at the inner end of each slot being in the form of the arc of a circle said disk having edges at the sides of said slot tangent to said arc and merging with an enlarged circular portion of the slot at the outer end thereof, a conductor in said slot, and a wedge of substantially cylindrical cross section in said portion for retaining said conductor.

2. In a dynamo-electric machine, a disk for a core thereof, said disk having a plurality of radial slots extending inwardly from its periphery, the edge of said disk at the inner end of each slot being in the form of the arc of a circle said disk having edges at the sides of said slot tangent to said arc and merging with an enlarged circular portion of the slot at the outer end thereof, a wedge in the enlarged portion of the slot and a conductor beneath the wedge and retained thereby.

3. A disk for a dynamo-electric machine core, said disk having a slot extending inwardly from its periphery, the edge of said disk at the inner end of said slot being in the form of the arc of a circle said disk having edges at the sides of said slot tangent to said arc and intersecting an enlarged portion of the slot the sides of which corresponding to said side edges form the opposite sides of a larger circle a portion of the circumference of which extends beyond the circumference of the disk.

4. A disk for a core of a dynamo-electric machine, said disk having a slot extending inwardly from its periphery, said slot having a substantially cylindrical outer portion adapted to receive a round wedge and a contracted inner portion adapted to contain conductors, said disk provided with a shoulder in the enlarged portion acting to prevent removal of said wedge by centrifugal force, and a shoulder formed by the intersection of said outer portion with said contracted portion to rigidly hold said wedge against inward movement.

5. A disk for an armature core provided with a slot extending inwardly from its periphery, said slot having an outer portion with sides forming arcs of a circle whereby a single substantially cylindrical wedge may be supported in said portion and a contracted inner portion adapted to contain a conductor, the disk provided with a shoulder in the outer portion of the slot acting to prevent removal of said wedge by centrifugal force, and a shoulder formed by the intersection of said outer circular portion and said contracted portion acting to prevent inward movement of said wedge.

6. In a dynamo-electric machine construction, a magnetizable core having a slot therein adapted to receive a conductor, said core near the outer end of said slot being shaped to provide an enlarged cylindrical longitudinal portion and a wedge having a cylindrical portion adapted to fit within said slot portion to retain said conductor.

7. In a dynamo-electric machine construction, a magnetizable core having a slot therein adapted to contain a conductor and a single round wedge the cross section of which is continuously circular for more than 180° cooperating with said slot to retain said conductor.

8. A slot closer for a dynamo-electric machine comprising a solid rod of dielectric material substantially cylindrical in cross-section and adapted to be driven into a slot of a dynamo-electric machine from one end of the slot.

9. A slot closer for a dynamo-electric machine comprising a solid rod of bakelite substantially cylindrical in cross-section and adapted to be driven into a slot of a dynamo-electric machine from one end of the slot.

10. A slot closer for an open slot magnetizable member of a dynamo-electric machine comprising a rod of dielectric material adapted to be driven into a slot from one end thereof, the portion of the longitudinal surface of said rod facing outwardly of the slot and between the side edges of the mouth of the slot conforming to the curvature of the surface of the magnetizable member, the remainder of the longitudinal surface being cylindrical in cross-section.

11. In a dynamo-electric machine, a magnetizable member having a radially extending slot, an outer portion of each side wall of said slot having a groove with the surface of the groove lying in the surface of a cylinder, the width of the plane of generation of the cylinder being greater than one-half the width of a portion of the slot immediately below the grooves, the axis of generation of the cylinder lying below the mouth of the slot.

12. In a dynamo-electric machine, a magnetizable member having a slot, an outer portion of each side wall of said slot having a groove with the surface of the groove lying in the surface of a cylinder, the width of the plane of generation of the cylinder being greater than one-half the width of a portion of the slot immediately below the grooves, the axis of generation of the cylinder lying below the mouth of the slot.

13. In a dynamo-electric machine, a magnetizable member having a slot, an outer portion of each side wall of said slot having a groove with the surface of the groove lying in the surface of a cylinder, the width of the plane of generation of the cylinder being greater than one-half the width of a portion of the slot immediately below the grooves, the axis of generation of the cylinder lying below the mouth of the slot, a conductor extending through said slot, and a cylindrical slot closer extending through said slot and engaged in said grooves.

14. In a dynamo-electric machine, a magnetizable member having a slot, an outer portion of each side wall of said slot having a groove with the surface of the groove lying in the surface of a cylinder, the width of the plane of generation of the cylinder being greater than one-half the width of a portion of the slot immediately below the grooves, the axis of generation of the cylinder lying below the mouth of the slot, a channel-shaped insulating liner for said slot having marginal edge portions extending upwardy into said grooves, a conductor extending through the channel of said liner, and means extending through said slot above said conductor and extending into said grooves, said means clamping said marginal edge portions against the surfaces of the walls of the slot within the grooves.

15. In a dynamo-electric machine, a magnetizable member having a conductor receiving open slot having a groove in each wall adjacent the top thereof, a channel-shaped insulating liner for said slot and having its marginal edges adjacent the top of the slot, and a slot closer between said marginal edges and clamping them against the walls of said grooves of the slot.

In witness of the foregoing I affix my signature.

HENRY H. WAIT.